US012257478B1

(12) United States Patent
Yao et al.

(10) Patent No.: US 12,257,478 B1
(45) Date of Patent: Mar. 25, 2025

(54) METHOD FOR ASSISTING GOLF TRAINING AND COMPUTER PROGRAM PRODUCT (71) Applicant: Xiamen Xingtel Artificial Intelligence Co., Ltd., Fujian (CN)

(72) Inventors: Canrong Yao, Fujian (CN); Renyu Huang, Fujian (CN); Yinzhong Chen, Fujian (CN)

(73) Assignee: Xiamen Xingtel Artificial Intelligence Co., Ltd., Fujian (CN)

( * ) Notice: Subject to any disclaimer, the term of this patent is extended or adjusted under 35 U.S.C. 154(b) by 0 days.

(21) Appl. No.: 18/824,213

(22) Filed: Sep. 4, 2024

Related U.S. Application Data (63) Continuation of application No. 18/788,219, filed on Jul. 30, 2024, now abandoned.

(30) Foreign Application Priority Data

Jun. 28, 2024 (CN) .......................... 202410864572.8

(51) Int. Cl.
A63B 24/00 (2006.01)
A63B 102/32 (2015.01)

(52) U.S. Cl.
CPC ...... *A63B 24/0006* (2013.01); *A63B 24/0021* (2013.01); *A63B 2024/0015* (2013.01); *A63B 2024/0056* (2013.01); *A63B 2102/32* (2015.10); *A63B 2220/05* (2013.01); *A63B 2220/806* (2013.01)

(58) Field of Classification Search
CPC ............ A63B 24/0006; A63B 24/0021; A63B 2102/32; A63B 2024/0015; A63B 2024/0056; A63B 2220/05; A63B 2220/806
See application file for complete search history.

(56) References Cited

U.S. PATENT DOCUMENTS

| | | | | |
|---|---|---|---|---|
| 9,211,439 B1* | 12/2015 | Pedenko | ................ | A63B 69/36 |
| 9,357,329 B2* | 5/2016 | Jeffery | .............. | H04M 1/72403 |
| 9,604,142 B2* | 3/2017 | Bentley | .............. | A63B 24/0006 |
| 11,132,533 B2* | 9/2021 | Dreessen | ............. | G06V 10/751 |
| 11,638,853 B2* | 5/2023 | Yang | ..................... | G06V 40/23 434/247 |
| 11,941,915 B2* | 3/2024 | Tyomkin | ............ | G06V 40/1365 |
| 11,951,372 B2* | 4/2024 | Tuxen | ................ | A63B 24/0006 |
| 11,986,719 B2* | 5/2024 | Vale | ................... | A63B 71/0622 |

* cited by examiner

Primary Examiner — Gregory M Desire
(74) Attorney, Agent, or Firm — Cooper Legal Group, LLC (57) ABSTRACT The invention provides a method for assisting golf training and a computer program product. The method includes: capturing a video of current swing by a user and simulator data; analyzing a swing action by using human body key points, to obtain swing stages and corresponding key point set sequences; determining a plurality of action features corresponding to the current swing; comparing the plurality of action features of the current swing with a plurality of action features corresponding to an optimal personal swing model to obtain an action difference between the current swing and the optimal personal swing model; and according to the simulator data, determining a result difference between the current swing and the optimal personal swing model. With the utilization of the above technical solution, golf playing skills can be improved according to physical conditions of the user.

12 Claims, 5 Drawing Sheets

Key point sequence of complete swing action

METHOD FOR ASSISTING GOLF TRAINING AND COMPUTER PROGRAM PRODUCT

CROSS-REFERENCE TO RELATED APPLICATIONS

This application is a continuation of U.S. patent application Ser. No. 18/788,219, filed Jul. 30, 2024, which claims priority to Chinese Patent Application 202410864572.8, filed on Jun. 28, 2024. U.S. patent application Ser. No. 18/788,219 and Chinese Patent Application 202410864572.8 are incorporated herein by reference.

TECHNICAL FIELD

The invention relates to the technical field of golf, and in particular, to a method for assisting golf training and a computer program product.

BACKGROUND

With the promotion and popularization of golf in the world, more and more people like golf. However, due to the limitation of golf venues, high technical skills, high standardization of actions and great difficulty in learning, full-time coaches are usually needed, so the cost of the whole sports practice is relatively high. At present, in order to improve the training level and reduce the training cost, various golf simulators have emerged. One of the current mainstreams is to correct the actions through specific auxiliary devices; and the other is to record the actions of trainees through image recognition and compare these actions with standard actions of famous persons to correct them.

However, shortcomings in the use of the auxiliary devices include: discrepancy with the sports scenarios of actual golf venues, for example, various detection sensors need to be worn, which will lead to uncomfortable limb movements. In addition, a standard reference model used in current image comparison methods is usually relatively constant, under which reference to the actions of famous stars or fixed standard actions are generally made. However, it is difficult for different trainees to implement the actions of famous golf stars because of their different physical qualities and golf playing skills, which greatly affects the learning enthusiasm for the trainees; moreover, the forced imitation of the actions of the golf stars are also easy to cause sports injuries.

SUMMARY

An embodiment of the invention provides a method for assisting golf training and a computer program product. An optimal personal model of a user is set and used to assist user training, so that the user can steadily improve golf playing skills on the premise that his/her physical conditions are satisfied.

In order to achieve the above objective, in an aspect, a method for assisting golf training is provided and includes:
  capturing a video of current swing by a user and corresponding simulator data, where the simulator data includes golf hitting data and golf flight data of the current swing, the video is captured by a video acquisition device, and the simulator data is captured by a golf simulator;
  analyzing a swing action in the video by using a plurality of preset human body key points related to the swing action to obtain an image frame sequence corresponding to each swing stage in the current swing and further obtain a human body key point set sequence corresponding to each image frame sequence, where each frame image is corresponding to a human key point set, and a single swing action includes a plurality of predetermined swing stages;
  according to a relationship between the human body key points in the human body key point set sequence corresponding to each swing stage, determining a plurality of action features corresponding to a current swing action;
  aligning the plurality of action features of the current swing with a plurality of action features corresponding to an optimal personal swing model preset for the user in time and space; comparing one or more of the plurality of action features of the current swing with corresponding one or more of the plurality of action features corresponding to an optimal personal swing model to obtain an action difference between the current swing and the optimal personal swing model, where the optimal personal swing model is preselected from historical swing actions of the user or is a swing action set by the user under the guidance of a coach; and
  comparing the golf hitting data and/or golf flight data of the current swing with golf hitting data and/or golf flight data corresponding to the optimal personal swing model, to obtain a swing result difference between the current swing and the optimal personal swing model.

Preferably, the method further includes: providing evaluation, diagnosis and/or correction suggestions for the current swing according to the action difference and/or the swing result difference.

Preferably, the method further includes: displaying the current swing action, the action difference and/or the swing result difference from a specified view according to received instructions.

Preferably, in the method,
  the golf hitting data and the golf flight data include: a golf hitting position, a golf serving angle, a golf serving speed, a golf flight distance, a rotation direction and/or a rotation speed;
  the plurality of action features include: player height-to-body width ratio information, a head position, positions of five sense organs, a left shoulder apex position, a right shoulder apex position, a left elbow position, a right elbow position, a left wrist position, a right wrist position, a left hip position, a right hip position, a left knee position, a right knee position, a left heel position, a right heel position, a left tiptoe position, a right tiptoe position, a human body skeleton line, an Euler angle of the torso, a stance inclination angle, a human body revolving speed, traces of selected human body key points, traces of selected human body parts, a wrist swing trace and/or a swing speed;
  the action difference includes: an average distance of the selected human body key points at a corresponding moment, trace similarity of the selected human body key points or human body parts, a vector cosine distance of selected vectors, an angle change curve of selected angles, a maximum angle difference between selected angles, a maximum speed difference between selected speeds and/or a maximum difference between stance inclination angles; and
  the swing result difference includes: an average golf speed difference, a maximum golf speed difference, an average distance of golf hitting points, a golf serving angle difference, a golf flight distance difference and/or a golf rotation direction difference.

Preferably, in the method, the analyzing a swing action in the video by using a plurality of preset human body key points related to the swing action to obtain an image frame sequence corresponding to each swing stage in the current swing and further obtain a human body key point set sequence corresponding to each image frame sequence includes:

using a trained human body key point detection model to obtain a human body key point set corresponding to each image frame in all image frames included in the current swing;

using a pre-trained action alignment network model to align the image frames included in the current swing with a preset complete swing action frame number template in time to obtain an image frame sequence after such alignment during the current swing;

using a trained action classification model to perform action classification on the sequence of the image frames aligned during the current swing, to obtain an image frame sequence corresponding to the swing stage in the current swing; and according to the human body key point sets corresponding to the image frames, obtaining the human body key point set sequence corresponding to the image frame sequence.

Preferably, after the obtaining the human body key point set sequence corresponding to each image frame sequence, the method further includes: performing smooth filtering on the human body key points in the human body key point sets corresponding to the image frames to obtain human body key points subjected to the smooth filtering;

the obtaining the human body key point set sequence corresponding to the image frame sequence according to the human body key point sets corresponding to the image frames indicates obtaining the human body key point set sequence corresponding to the image frame sequence according to the human body key point sets constituted by the human body key points subjected to the smooth filtering.

Preferably, in the method, the displaying the current swing action, the action difference and/or the swing result difference from a specified view includes:

for each frame in the image frame sequence corresponding to the swing stage in the current swing, generating a multi-view video by using a trained multi-view diffusion model SMD, where the multi-view diffusion model SMD is pre-trained by using a multi-view action picture pre-acquired by the video acquisition device, parameters of the video acquisition device, an example segmentation model SegNet for segmenting human body regions and human body joints; and after receiving instructions, displaying and/or playing the swing action from the specified view.

Preferably, in the method, the displaying and/or playing the swing action from the specified view includes:

using a predetermined generation model, according to the action features of the current swing in the image frame sequence corresponding to each swing stage in the current swing and body parameters of the user, to generate a translucent digital person swinging in a transparent background; preferably, during user registration, generating a basic initial digital human model for the user according to basic information such as height, weight and gender provided by the user;

using the multi-view diffusion model SMD to reconstruct a digital person from the specified view, where when the swing action is played, the reconstructed digital person is superimposed in the reconstructed swing picture according to the specified view.

Preferably, the method further includes one or more of the following steps:

according to a plurality of action features of single swing and golf hitting data and golf flight data corresponding to the single swing, modeling the single swing, and storing video pictures of the single swing, the plurality of action features of single swing and/or the golf hitting data and golf flight data corresponding to the single swing as data included in records of the single swing model, where the single swing includes the current swing; and updating the optimal personal swing model according to training situations and/or assessment situations of the user.

In another aspect a computer program product is further provided, and includes a computer program, where when the computer program is executed by a processor, steps of the method for assisting golf training as described in any one of the foregoing are implemented.

In still another aspect, a device for assisting golf training is further provided and includes a memory and a processor, where the memory stores at least one and the at least one program is executed by the processor to implement steps of the method for assisting golf training as described in any one of the foregoing.

The technical solution has the following technical effects:

for the technical solution according to the embodiment of the invention, the swing action of the user is captured by the video acquisition device and the simulator data when the user swings is acquired by the simulator; through analysis on the swing action of the user and the simulator data, the swing action of the user is associated with the swing result or swing quality reflected by the simulator data; the current swing action and result of the user is compared with the swing action and result corresponding to the optimal personal swing model set for the user and constituted by the swing actions of the user, so that the user can see the shortcomings of the current swing action, ensuring that the user, such as a golf enthusiast or athlete, can steadily improve his/her golf playing skills on the premise that his/her physical conditions are met;

in a further embodiment, the optimal personal swing model is updated according to the rise of the technical level of the user or the completion of the training plan of the user, so that the user can achieve progressive training according to the current level.

Furthermore, the method according to the embodiment of the invention can be used to provide the user with a staged test evaluation function, and the action training is associated with the effect data after the golf is hit by docking the golf training simulator, which can help the user to monitor the learning progress in real time and plan a training path scientifically.

DESCRIPTION OF EMBODIMENTS

To further illustrate various embodiments, the invention is provided with accompanying drawings. These accompanying drawings are part of the disclosure of the invention, are mainly used to illustrate the embodiment and can explain the operation principle of the embodiments together with relevant descriptions in the specification. With reference to these contents, ordinary persons skilled in the art should be able to understand other possible embodiments and the advantages of the invention. Components in the drawings are not drawn to scale, and similar component symbols are usually used to represent similar components.

The invention will now be further described with reference to the accompanying drawings and specific embodiments.

Embodiment 1

Figure 1:
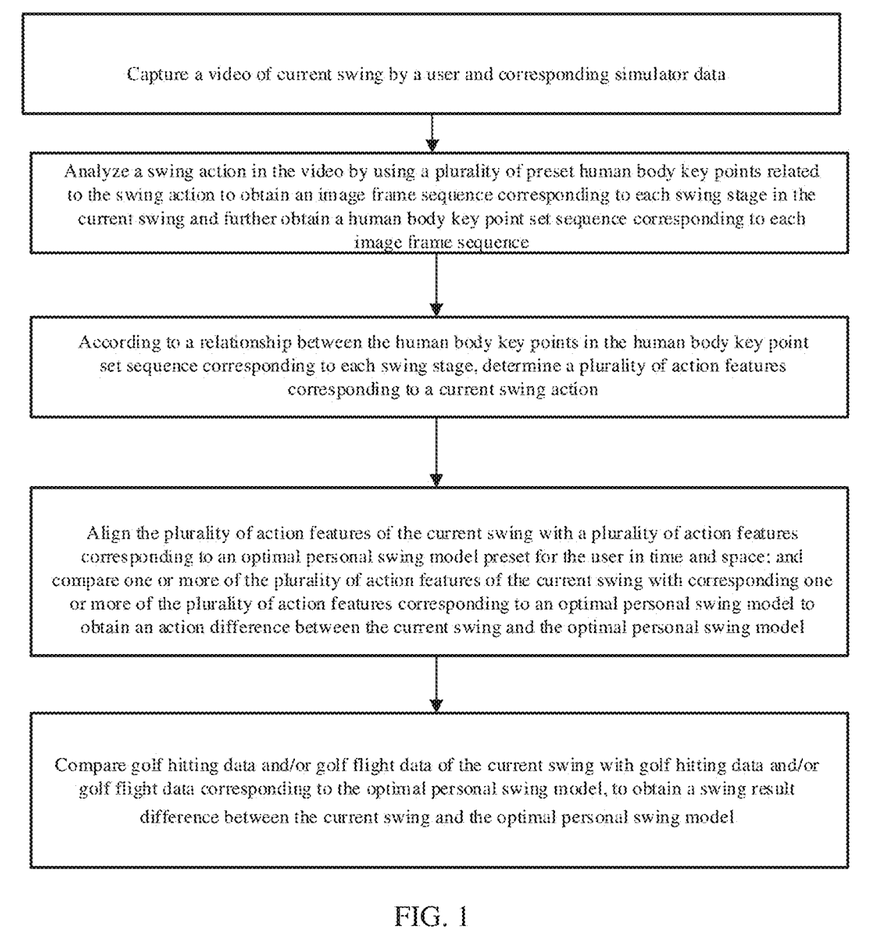
FIG. 1 is a process diagram of a method for assisting golf training according to an embodiment of the invention.

FIG. 1 is a process diagram of a method for assisting golf training according to an embodiment of the invention. As shown in FIG. 1, the method for assisting golf training according to an embodiment of the invention includes:

Data acquisition:
capture a video of current swing by a user and corresponding simulator data, where the simulator data includes golf hitting data and golf flight data of the current swing, the video is captured by a video acquisition device, and the simulator data is captured by a golf simulator.

Such data acquisition includes acquisition of swing action video data by the video acquisition device and acquisition of golf hitting data and golf flight data by the golf simulator.

In a specific embodiment, swing action videos are not limited to video data acquired by an on-site video acquisition device, but also include uploaded video files pre-acquired, videos shot by high-definition cameras at different angles or videos shot by intelligent terminals such as mobile phones.

In a case that a PC terminal is used, one or more cameras (preferably, no more than six cameras are provided), motion sensors, gyroscopes and depth cameras can be connected to acquire swing data; in a case that mobile devices are used, the cameras and the gyroscopes from multiple angles can be connected through WIFI or a local area network (LAN). Club data, golf hitting data and data flight data are acquired by the high-speed camera of the simulator.

Data Analysis:
a swing action in the video is analyzed by using a plurality of preset human body key points related to the swing action, to obtain an image frame sequence corresponding to each swing stage in the current swing and further obtain a human body key point set sequence corresponding to each image frame sequence, where each frame image is corresponding to a human key point set, and a single swing action is set to include a plurality of predetermined swing stages; in a specific embodiment, the single swing action is set to include five swing stages; and in other embodiments, the single swing action is set to include less than five or more than five swing stages.

According to a relationship between the human body key points in the human body key point set sequence corresponding to each swing stage, a plurality of action features corresponding to a current swing action is determined.

In a specific embodiment, after the swing video of the user is accurately captured by the high-definition camera and the golf hitting data and the golf flight data are acquired by the simulator, the whole swing process is modeled and analyzed by the following steps.

(1) Extraction of Human Body Key Points

Figure 2:
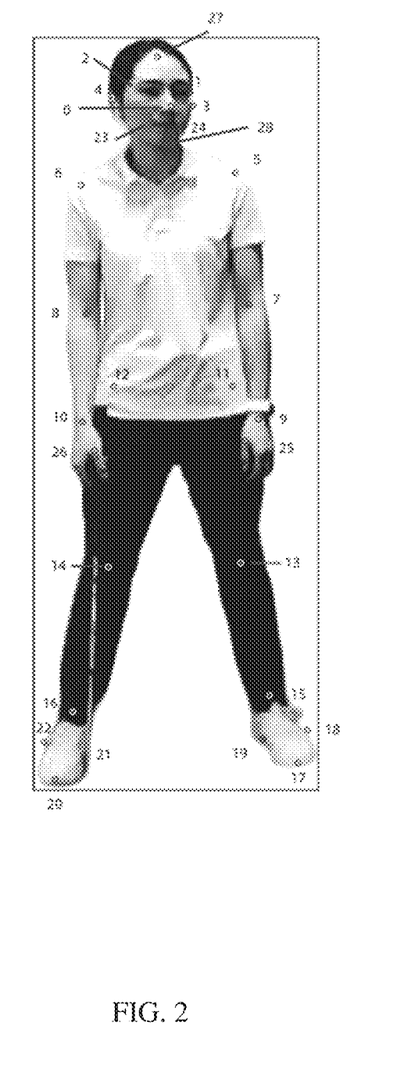
FIG. 2 is a process diagram showing extraction of human body frames and human body key points according to an embodiment of the invention.

In the embodiment, 29 key points are marked for the human body in each frame of video images, as shown in FIG. 2. In FIG. 2, These key points include: point 0 on the nose bridge, point 1 on the left eye, point 2 on the right eye, point 3 on the left cheek, point 4 on the right cheek, point 5 on the left shoulder, point 6 on the right shoulder, point 7 on the left elbow, point 8 on the right elbow, point 9 on the left wrist, point 10 on the right wrist, point 11 on the left hip, point 12 on the right hip, point 13 on the left knee, point 14 on the right knee, point 15 on the left leg, point 16 on the right leg, points 17, 18, 19 on the left foot, points 20, 21, 22 on the right foot, point 23 on the right mouth corner, point 24 on the left mouth corner, point 25 on the left thumb, point 26 on the right thumb, and point 28 on the jaw. The ordinary persons skilled in the art know that the selection of 29 key points is only exemplary, and other more or less human body key points related to the golf swing action can be selected without creative labor.

In a specific embodiment, human body and human body key point detection models, such as YoloPose, HRNet and PPDetection, are used for training to obtain the human body key point detection model according to the embodiment of the invention $M_{pose}$. The model $M_{pose}$ is used for detecting the human body and human body key points in each image frame of swing videos, such as video V. Specifically, each frame extracted from the video V by decoding or a k(th) frame $Frame_k$ obtained by sampling is subjected to inference operation and normalization operation Norm by using the model $M_{pose}$, to obtain a human body frame $Rect_k$ and a human body key point set $P_k=\{p_0, \ldots, p_{28}\}$ in the image as shown in FIG. 2, where the human body frame is indicated by a frame as shown in FIG. 2, namely:

$$Rect_k, P_k = Norm(M_{pose}(Frame_k)).$$

$Rect_k, P_k$ includes the coordinates, width and height of the top left corner of the image where the frame is located, namely, [x, y, w, h]. The key point set $P_k$ includes 29 key points $\{p_0, \ldots, p_{28}\}$, as indicated by a dot as 2, and each key point is the coordinate position [x, y] of the point in the image.

Due to the problems such as shielding and angle in a detection process, $M_{pose}$ predicted key points may have abnormal values or outliers. In order to solve the problems, preferably, a key point filtering algorithm is used to smooth $M_{pose}$ the predicted key points. In an embodiment, for the $M_{pose}$ predicted $Rect_k$ and $P_k$, a low-pass filtering operation $H(\cdot\cdot)$ and 2t of context information of $P_k$ are used to perform filtering operation, so as to obtain a smooth predicted value (namely, a predicated point set $P'_k$) corresponding to the human body key point set $P_k$, namely:

$$P'_k = H([P_{k-r}, \ldots, P_{k+t}])$$

(2) Swing Action Sequence Detection

After the key point sequence of the video V is obtained through a key point extraction step, in order to detect the specific position of one swing action in the video, a model for detecting one swing action is obtained by training a sequence detection network based on a PoolFormer network structure $M_{pF}$.

In this example, the video V may include one or more complete swing actions.

For the key point set sequence $\{P'_0, \ldots, P'_n\}$ of the video V obtained through key point extraction and filtering steps, the key point set sequence includes key point sets corresponding to n frames of images; the swing action is detected by using $M_{pF}$, to obtain a key point sequence segment $\{S_1, \ldots, S_m\}$ including a plurality of swing actions, and information included in $S_k$ is a segment key point set sequence $\{P'_{q-r}, \ldots, P'_{q-1}, P'_q\}$ in the swing action, namely, the key point sets in the (r+1) frames of images from the (q-r)th frame to the q(th) frame, where q and r are natural numbers; here, k is a variable and taken from a natural number from 1 to m; and the number of frames included in different $S_i$ can or may be different. When the video V includes only one swing action, the key point sequence segment detected $M_{pF}$ has only $S_1$.

(3) Action Decomposition

In order to facilitate more detailed action comparison and analysis, preferably, the action sequences included in one swing action obtained through swing action sequence detection are aligned and normalized. Specifically, a standard complete swing sequence $S_s = \{P_i, \ldots, P_{i+z}\}$ is pre-established and used as a length or frame number template to identify the number of frames included in one standard complete swing action. In this example, illustratively, z=240, that is, the number of action frames based on 240 frames. In order to align each element $S_k$ of $\{S_1, \ldots, S_m\}$ to the action sequences with the number of z, each element here is aligned to 240 frames, and an action alignment network is pre-trained $M_{align}$; and each swing action is aligned to a same length by using $M_{align}$, namely:

$$S'_k = M_{align}(S_k).$$

Therefore, $S'_k$ also includes 240 key point sets $S'_k = \{P_k^0, \ldots, P_k^{239}\}$.

In this example, the swing action is decomposed into the following five swing stages: Takeaway→Backswing→Downswing→Follow-Through→Finish.

Figure 3:
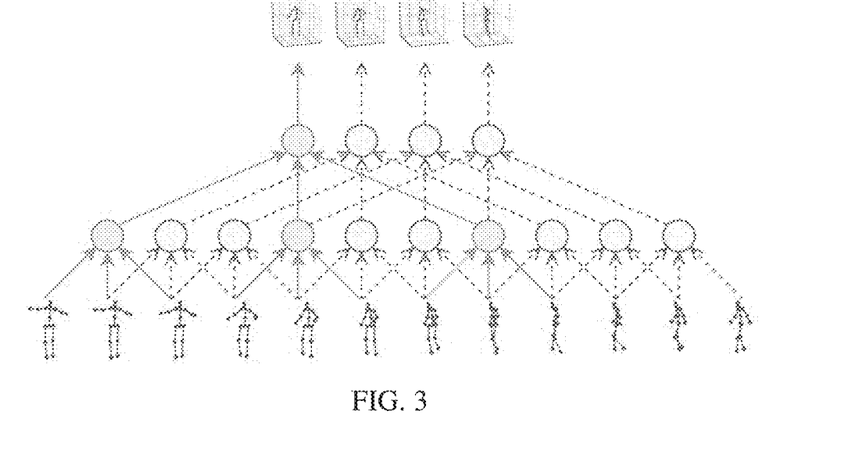
FIG. 3 is a process diagram showing stage detection and classification of a swing action according to an embodiment of the invention.

Therefore, the key point sets $\{P_k^0, \ldots, P_k^{239}\}$ included in each swing action are intercepted and classified according to five types of five stages [Takeaway, Backswing, Downswing, Follow-Through, Finish], and an action classification model $M_{PFtiny}$ is trained by combining with PoolFormer-tiny. The trained action classification model $M_{PFtiny}$ is used for further detection and classification of $S'_k$, to obtain the key point sequences of various stage actions $S_k^{TW}$, $S_k^{BS}$, $S_k^{DS}$, $S_k^{FT}$, and $S_k^{FN}$. Elements of $S_k^{TW}$, $S_k^{BS}$, $S_k^{DS}$, $S_k^{FT}$, and $S_k^{FN}$ are composed of segment key point sets included in $S'_k$. Refer to FIG. 3 for details. As shown in FIG. 3, the key point sequence of the complete swing action is classified and the key point sequence corresponding to the corresponding stage action is output.

Figure 4:
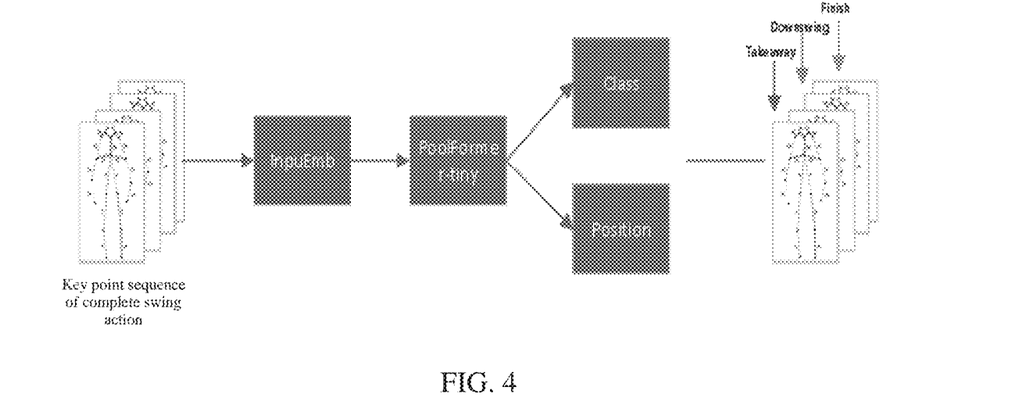
FIG. 4 is a schematic diagram showing feature space transformation according to an embodiment of the invention.

(4) Feature Space Transformation and Calculation;

Preferably, in order to improve the comparison effect of the swing action in space and time, in the embodiment, a NeRF model $M_{VPN}$ is trained according to the key point attributes and video acquisition methods mentioned above, and a plurality of frame sequences can be mapped to a standard space by using the NeRF model $M_{VPN}$. The NeRF model $M_{VPN}$ is used to convert $\{S_1, \ldots, S_m\}$ for $\{S'_1, \ldots, S'_m\}$ detected in the images into $\{D_1, \ldots, D_m\}$ or $\{D'_1, \ldots, D'_m\}$ in the standard space. FIG. 4 shows feature space transformation.

(5) Action Feature Extraction

A relationship between the sequence key points included in each stage of $S_k^{TW}$, $S_k^{BS}$, $S_k^{DS}$, $S_k^{FT}$, and $S_k^{FN}$ is calculated to calculate a plurality of action features corresponding to the current swing action, where the plurality of action features include: player height-to-body width ratio information, a head position, positions of five sense organs, a left shoulder apex position, a right shoulder apex position, a left elbow position, a right elbow position, a left wrist position, a right wrist position, a left hip position, a right hip position, a left knee position, a right knee position, a left heel position, a right heel position, a left tiptoe position, a right tiptoe position, a human body skeleton line, an Euler angle of the torso, a stance inclination angle, a human body revolving speed, traces of selected human body key points, traces of selected human body parts, a wrist swing trace and/or a swing speed; and the action features are selected according to actual needs of users and training.

Illustratively, a trace of a single key point $Trace_j^A$ can be obtained by extracting a trace sequence of the single key point $p_j$ selected in a swing action A, where:

$$Trace_j^A = \{p_{j0}^A, \ldots, p_{jn}^A\};$$

In this example, it is assumed that the swing action A includes n frames of images.

According to the selection and showing needs of the users, a trace of a plurality of or all key points selected or a trace of parts selected can be obtained, where the trace of parts selected is identified by the trace of key points on this part.

In other embodiments, as shown in FIG. 2, an intermediate point $p_{m1}$ of key point 5 $p_5$ and key point 6 $p_6$ and an intermediate point $p_{m2}$ of key point 11 $p_{11}$ and key point 12 $p_{12}$ are obtained; $p_{m1}$ and $p_{m2}$ are connected to obtain the fish-bone line of the human body $L_{F1}$, namely:

$$L_{F1} = Line(p_{m1}, p_{m2}).$$

In an embodiment, according to the plan made by the coach and the selected areas of concern or indicators of concern such as parts of concern or measured values of concern including speed and maximum rotation angle, for example, when the change in a steering angle of a head needs to be calculated, a Euler angle formed by the human body key points 5, 6, 27 as shown in FIG. 2 can be calculated: {Yaw, Pitch, Roll}.

Therefore, the corresponding action feature set can be extracted for a moment k:

$$F_k = \{f_i | f_i \in R^N\}, N > 40;$$

Illustratively, when more than 40 actions features are selected, N is greater than 40; in other embodiments, N may be less than or equal to 40 according to the number of action features selected.

Preferably, the action features of the current swing obtained from the above analysis are stored in the record corresponding to the current swing as the data of the current swing process.

Further, according to current swing data including the above action feature data, the golf hitting data, golf flight data and club data obtained by the simulator, the video picture of the current swing, the current swing is modeled, and the current swing data is stored as the data in the record of the current swing model. Further, each single swing of the user can be modeled accordingly, and the corresponding data can be stored in a model library as a record corresponding to the model.

(6) Action Comparison

The plurality of action features of the current swing is aligned with a plurality of action features corresponding to an optimal personal swing model preset for the user in time and space; one or more of the plurality of action features of the current swing is compared with corresponding one or more of the plurality of action features corresponding to an optimal personal swing model to obtain an action difference between the current swing and the optimal personal swing model, where the optimal personal swing model is preselected from historical swing actions of the user or is a swing action set by the user under the guidance of a coach; and golf hitting data and/or golf flight data of the current swing is compared with golf hitting data and/or golf flight data corresponding to the optimal personal swing model, to obtain a swing result difference between the current swing and the optimal personal swing model.

Specifically, due to the difference in shooting angles, preferably, the obtained action features are to normalized to the same scale as the selected model by a normalization method. Then, the action features are aligned to a same phase, that is, the action features are aligned to a predetermined swing length (namely, a frame number template F) in time and the center coordinates of the human body frame.

$FN_k$ (value after alignment)=Align (Normalize($F_k$),F template)

In a specific embodiment, the alignment method Align ( ) is the nearest neighboring method, so that the actions acquired at each moment can match with the corresponding moment of the model.

Finally, the difference between a time line and space domain is calculated to obtain the comparison result, where the comparison result includes the action difference and the swing results; the action difference includes: an average distance of the selected human body key points at a corresponding moment, trace similarity of the selected human body key points or human body parts, a vector cosine distance of selected vectors, an angle change curve of selected angles, a maximum angle difference between selected angles, a maximum speed difference between selected speeds and/or a maximum difference between stance inclination angles; and the swing result difference includes: an average golf speed difference, a maximum golf speed difference, an average distance of golf hitting points, a golf serving angle difference, a golf flight distance difference and/or a golf rotation direction difference.

According to the embodiments of the invention, the difference between two swing actions is compared from the change in the action features in time and space.

For example, the relative degrees of the key points or the trace of two swing actions A, B can be compared. Specifically, traces of a single key point $\text{Trace}_j^A$ and $\text{Trace}_j^B$ can be obtained by extracting trace sequences of the single key point $p_j$ selected in two swing actions A and B, where $\text{Trace}_j^A = \{p_{j0}^A, \ldots, p_{jn}^A\}$ and $\text{Trace}_j^B = \{p_{j0}^B, \ldots, p_{jn}^B\}$;

a trace sequence distance $\text{Cos}_j^{AB}$ between two traces are calculated:

$$\text{Cos}_j^{AB} = \frac{\overrightarrow{\text{Trace}_j^A} \cdot \overrightarrow{\text{Trace}_j^B}}{|\overrightarrow{\text{Trace}_j^A}||\overrightarrow{\text{Trace}_j^B}|};$$

the value of $\text{Cos}_j^{AB} \in [-1, 1]$ being close to one indicates the high similarity of two key points $p_j$ of two swing actions A and B in the whole swing process; on the contrary, this means that the swing actions are quite different; and the comparison of the current swing with the swing in the optimal personal model means that the current swing is much worse and needs to be adjusted.

The trace sequence distance of all key points included in the swing actions A and B can be further calculated; and the mean distance of points trace (MDPT) of all key points included in the swing actions A and B can be further calculated:

$$MDPT_{AB} = \frac{1}{n}\sum_{i=0}^{n}\text{Cos}_i^{AB}$$

According to the selection of the user, the trace sequence distance of the selected key points between two swing actions and the mean distance of points trace of all key points can be selected as the comparison result.

(7) Multi-View Comparison Presentation

Preferably, in order to reflect the real difference, the embodiment provides the function of showing the swing actions of the user and difference from multiple views.

In a specific embodiment, for each frame in the image frame sequence corresponding to the swing stage in the current swing, a multi-view video is generated by using a trained multi-view diffusion model SMD, where the multi-view diffusion model SMD is pre-trained by using a multi-view action picture pre-acquired by the video acquisition device, parameters of the video acquisition device, an example segmentation model SegNet for segmenting human body regions and human body joints; and after instructions are received, the swing action is displayed and/or played from the specified view.

Figure 5:
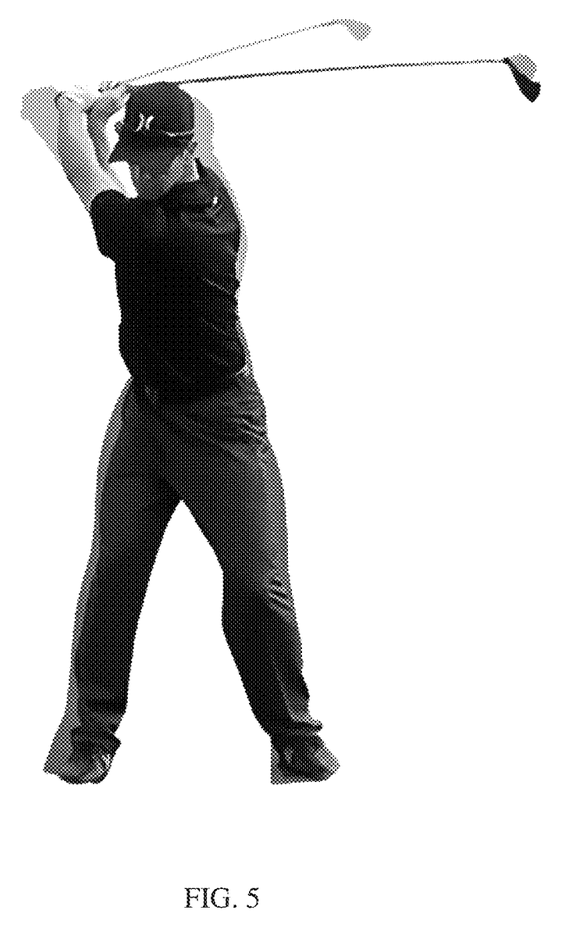
FIG. 5 is an effect diagram showing action comparison using a digital person.

Preferably, in order to reflect the comparison effect, in the embodiment of the invention, a predetermined generation model is, according to the action features of the current swing in the image frame sequence corresponding to each swing stage in the current swing and body parameters of the user, used to generate a translucent digital person swinging in a transparent background. Then, the SMD is used to reconstruct the digital person from a specific view. Finally, in a playing process, the reconstructed translucent digital person is superimposed in the reconstructed capture swing picture through a specific angle. As shown in FIG. 5, the reconstructed translucent digital person can be superimposed in the reconstructed capture swing picture, which can show the most real comparison difference.

Preferably, the method according to the embodiment of the invention further includes: providing evaluation, diagnosis and/or correction suggestions for the current swing according to the action difference and/or the swing result difference; and updating the optimal personal swing model according to training situations and/or assessment situations of the user.

Preferably, the method according to the embodiment of the invention further includes: according to the difference of swing results and reset grading rules, grading the current swing action, where such grading reflects the level of the current swing.

Embodiment 2

Figure 6:
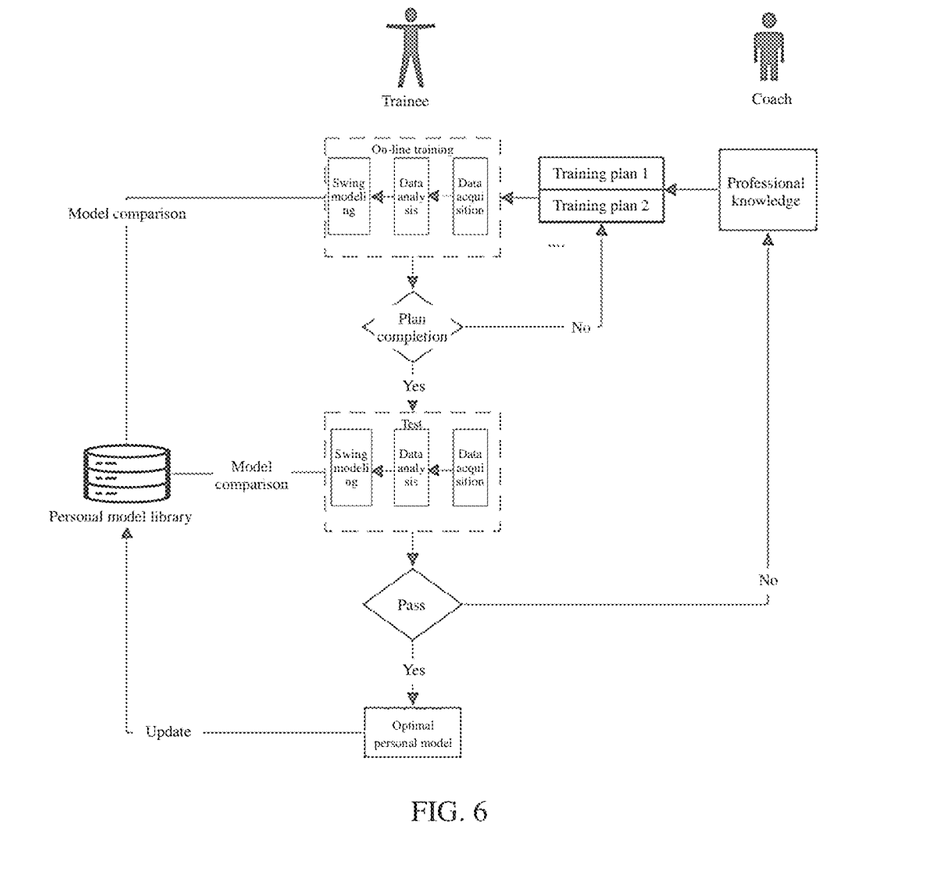
FIG. 6 is a process diagram of training and assessment using a method for assisting golf training according to an embodiment of the invention.

FIG. 6 is a process diagram of training and assessment using a method for assisting golf training according to an embodiment of the invention.

In the embodiment, a user swings under the guidance of a coach; and the swing action of the user that satisfies the predetermined swing quality is set as the optimal personal model of the user. Under the optimal personal model, the coach can set up multiple training plans for trainees. In a training process, the trainees can judge their own training situations by comparing their own swing actions with those in the current optimal personal model. After the training plans are completed, a test can be set; the swing action of the user in the test is compared with that in the current optimal personal model to evaluate whether the user passes the test. If the user passes the test, the current optimal personal model can be updated according to a next training plan. In the embodiment of the invention, the comparison is made based on the optimal personal model formulated by the user under the guidance of professional coaches; in the technical solution, the physical condition, technical level and personal characteristic of the user will be fully considered, thereby providing the user with the training solution that is most suitable for the actual demand and achieving safe and gradual improvement for the user.

As shown in FIG. 6, when the method according to the embodiment of the invention is used to assist the user in training or test, data acquisition, data analysis and swing modeling are performed for the current swing of the trainee; and the model established for the current swing is compared with the preset optimal personal model.

The swing modeling according to the embodiment of the invention includes:
  a. generating a basic digital person model for the user according to basic information such as height, weight and gender provided by the user; in an embodiment, when the user registers and inputs the basic information, an initial digital person model can be generated for the user;
  b. selecting an initial optimal personal model under the guidance of the coach, to be specific, selecting a swing action video from multiple initial optimal personal swing videos uploaded as the optimal personal model; and updating the optimal personal model according to training analysis and comparison results or test results;
  c. modeling process: according to the results obtained in the data analysis step mentioned in Embodiment 1, extracting each frame of the swing data in the current swing video, where the swing data includes but is not limited to: coordinate positions of the human body in the picture, positions of human body key points, a human body skeleton line, an Euler angle of the torso, a human body revolving speed, angles of the torso, a golf hitting position, a golf serving speed, a golf flight angle, and the like;
  d. normalizing data;
  e. saving data updated according to the current swing data into a model library; and
  f. using an SMD model and the updated model library data to update a multi-view digital person for the user.

A single swing process is modeled by using relevant data of the single swing process of the user, such as action feature data, golf hitting data and golf flight data corresponding to the single swing; and the relevant swing data corresponding to the single swing process is stored in the model library as the record of the corresponding model. Specifically, the swing data corresponding to the single swing process is stored in each record in the model library, and includes, but is not limited to: a complete swing action picture, a golf hitting position, a golf serving position, a golf serving angle, a golf serving speed, a golf flight distance, a rotation direction, a rotation speed, player height-to-body width ratio information, a head position, positions of five sense organs, a left shoulder apex position, a right shoulder apex position, a left elbow position, a right elbow position, a left wrist position, a right wrist position, a left hip position, a right hip position, a left knee position, a right knee position, a left heel position, a right heel position, a left tiptoe position, a right tiptoe position, a human body skeleton line, an Euler angle of the torso, a stance inclination angle, a human body revolving speed, a wrist swing trace, a club head trace and/or a swing speed, and the like. The above records include the action feature of the single swing and the corresponding golf hitting data and golf flight data.

For the swing video or swing process selected as the optimal personal model, the data analysis similar to that in Embodiment 1 is also performed, and the above data related to the swing process in the optimal personal model is obtained and stored in the model library as the record of the optimal personal model. Corresponding record data can be directly extracted from the model library to compare two swing actions. Further, the data in the record can be used to calculate other data to be compared for analysis or comparison.

Embodiment 3

The invention further provides a device for assisting golf training, and the device includes a processor, a memory, and a computer program that is stored in the memory and can run on the processor; and when the processor executes the computer program, steps in the method according to the embodiment of the invention are implemented.

The method according to the embodiment of the invention can be implemented through software; and the software can be executed on a mobile terminal or a PC terminal.

Embodiment 4

The invention further provides a computer readable storage media, where a computer program is stored in the computer readable storage medium; and when the computer program is executed by a processor, steps of the method according to the embodiment of the invention are implemented.

Embodiment 5

The invention further provides a computer program product, and the computer program product includes a computer program; and when computer program is executed by a processor, steps of the method as described above are implemented.

Although the invention has been particularly shown and described with reference to preferred embodiments, it will be understood by those skilled in the art that various variations in form and details can be made in the invention without departing from the spirit and scope of the invention as defined in the appended claims, and all the variations fall within the protection scope of the invention.

The invention claimed is:

1. A method for assisting golf training, comprising:
capturing a video of a current swing by a user and corresponding simulator data, wherein the simulator data comprises golf hitting data and golf flight data of the current swing, the video is captured by a video acquisition device, and the simulator data is captured by a golf simulator;
analyzing a swing action in the video by using a plurality of preset human body key points related to the swing action to obtain an image frame sequence corresponding to each swing stage in the current swing and further obtain a human body key point set sequence corresponding to the image frame sequence, wherein each frame image of the image frame sequence is corresponding to a human body key point set of the human body key point set sequence, and a single swing action comprises a plurality of predetermined swing stages;
according to a relationship between the human body key points in the human body key point set sequence corresponding to each swing stage, determining a plurality of action features corresponding to a current swing action;
aligning the plurality of action features of the current swing with a plurality of action features corresponding to an optimal personal swing model preset for the user in time and space;
comparing one or more of the plurality of action features of the current swing with corresponding one or more of the plurality of action features corresponding to the optimal personal swing model to obtain an action difference between the current swing and the optimal personal swing model, wherein the optimal personal swing model is preselected from historical swing actions of the user or is a swing action of the user that is set by the user under guidance of a coach;
comparing at least one of the golf hitting data or the golf flight data of the current swing with at least one of golf hitting data or golf flight data corresponding to the optimal personal swing model, to obtain a swing result difference between the current swing and the optimal personal swing model;
according to a plurality of action features of a single swing and golf hitting data and golf flight data corresponding to the single swing, modeling the single swing to obtain a single swing model, and storing at least one of video pictures of the single swing, the plurality of action features of the single swing or the golf hitting data and golf flight data corresponding to the single swing as data comprised in records of the single swing model, wherein the single swing comprises the current swing; and
updating the optimal personal swing model according to at least one of training situations or assessment situations of the user.

2. The method according to claim 1, further comprising: providing at least one of evaluation, diagnosis, or correction suggestions for the current swing according to at least one of the action difference or the swing result difference.

3. The method according to claim 1, further comprising: displaying at least one of the current swing action, the action difference, or the swing result difference from a specified view according to received instructions.

4. The method according to claim 3, wherein the displaying at least one of the current swing action, the action difference, or the swing result difference from a specified view comprises:
for each frame in the image frame sequence corresponding to the swing stage in the current swing, generating a multi-view video by using a trained multi-view diffusion model Stable MultiView Diffusion (SMD), wherein the trained multi-view diffusion model SMD is pre-trained by using a multi-view action picture pre-acquired by the video acquisition device, parameters of the video acquisition device, an example segmentation model SegNet for segmenting human body regions and human body joints; and
after receiving instructions, at least one of displaying or playing the swing action from the specified view.

5. The method according to claim 4, wherein the at least one of displaying or playing the swing action from the specified view comprises:
using a predetermined generation model, according to the plurality of action features of the current swing in the image frame sequence corresponding to each swing stage in the current swing and body parameters of the user, to generate a translucent digital person swinging in a transparent background; and
using the trained multi-view diffusion model SMD to reconstruct a digital person from the specified view, where when the swing action is played, the reconstructed digital person is superimposed in a reconstructed swing picture according to the specified view.

6. The method according to claim 1, wherein
the golf hitting data and the golf flight data comprise at least one of: a golf hitting position, a golf serving angle, a golf serving speed, a golf flight distance, a rotation direction or a rotation speed;
the plurality of action features comprise at least one of: player height-to-body width ratio information, a head position, positions of five sense organs, a left shoulder apex position, a right shoulder apex position, a left elbow position, a right elbow position, a left wrist position, a right wrist position, a left hip position, a right hip position, a left knee position, a right knee position, a left heel position, a right heel position, a left tiptoe position, a right tiptoe position, a human body skeleton line, an Euler angle of a torso, a stance inclination angle, a human body revolving speed, traces of selected human body key points, traces of selected human body parts, a wrist swing trace or a swing speed;
the action difference comprises at least one of: an average distance of the selected human body key points at a corresponding moment, trace similarity of the selected human body key points, trace similarity of the selected human body parts, a vector cosine distance of selected vectors, an angle change curve of selected angles, a maximum angle difference between selected angles, a maximum speed difference between selected speeds or a maximum difference between stance inclination angles; and
the swing result difference comprises at least one of: an average golf speed difference, a maximum golf speed difference, an average distance of golf hitting points, a golf serving angle difference, a golf flight distance difference or a golf rotation direction difference.

7. The method according to claim 1, wherein the analyzing a swing action in the video by using a plurality of preset human body key points related to the swing action to obtain an image frame sequence corresponding to each swing stage in the current swing and further obtain a human body key point set sequence corresponding to the image frame sequence comprises:
- using a trained human body key point detection model to obtain a human body key point set corresponding to each image frame in all image frames comprised in the current swing;
- using a pre-trained action alignment network model to align the image frames comprised in the current swing with a preset complete swing action frame number template to obtain an image frame sequence after such alignment during the current swing;
- using a trained action classification model to perform action classification on the image frame sequence aligned during the current swing, to obtain an image frame sequence corresponding to the swing stage in the current swing; and
- according to the human body key point sets corresponding to the image frames, obtaining the human body key point set sequence corresponding to the image frame sequence.

8. The method according to claim 7, wherein
- after the obtaining the human body key point set sequence corresponding to the image frame sequence, the method further comprises: performing smooth filtering on the human body key points in the human body key point sets corresponding to the image frames to obtain human body key points subjected to the smooth filtering; and
- the obtaining the human body key point set sequence corresponding to the image frame sequence according to the human body key point sets corresponding to the image frames comprises obtaining the human body key point set sequence corresponding to the image frame sequence according to the human body key point sets constituted by the human body key points subjected to the smooth filtering.

9. A device for assisting golf training, comprising a memory and a processor, wherein the memory stores at least one program, and the at least one program is executed by the processor to implement steps of the method for assisting golf training according to claim 1.

10. A method for assisting golf training, comprising:
- capturing a video of a current swing by a user and corresponding simulator data, wherein the simulator data comprises golf hitting data and golf flight data of the current swing, the video is captured by a video acquisition device, and the simulator data is captured by a golf simulator;
- analyzing a swing action in the video by using a plurality of preset human body key points related to the swing action to obtain an image frame sequence corresponding to each swing stage in the current swing and further obtain a human body key point set sequence corresponding to the image frame sequence, wherein each frame image of the image frame sequence is corresponding to a human body key point set of the human body key point set sequence, and a single swing action comprises a plurality of predetermined swing stages;
- according to a relationship between the human body key points in the human body key point set sequence corresponding to each swing stage, determining a plurality of action features corresponding to a current swing action;
- aligning the plurality of action features of the current swing with a plurality of action features corresponding to an optimal personal swing model preset for the user in time and space;
- comparing one or more of the plurality of action features of the current swing with corresponding one or more of the plurality of action features corresponding to the optimal personal swing model to obtain an action difference between the current swing and the optimal personal swing model, wherein the optimal personal swing model is preselected from historical swing actions of the user or is a swing action of the user that is set by the user under guidance of a coach; and
- comparing at least one of the golf hitting data or the golf flight data of the current swing with at least one of golf hitting data or golf flight data corresponding to the optimal personal swing model, to obtain a swing result difference between the current swing and the optimal personal swing model, wherein
  - the golf hitting data and the golf flight data comprise at least one of: a golf hitting position, a golf serving angle, a golf serving speed, a golf flight distance, a rotation direction or a rotation speed;
  - the plurality of action features comprise at least one of: player height-to-body width ratio information, a head position, positions of five sense organs, a left shoulder apex position, a right shoulder apex position, a left elbow position, a right elbow position, a left wrist position, a right wrist position, a left hip position, a right hip position, a left knee position, a right knee position, a left heel position, a right heel position, a left tiptoe position, a right tiptoe position, a human body skeleton line, an Euler angle of a torso, a stance inclination angle, a human body revolving speed, traces of selected human body key points, traces of selected human body parts, a wrist swing trace or a swing speed;
  - the action difference comprises at least one of: an average distance of the selected human body key points at a corresponding moment, trace similarity of the selected human body key points, trace similarity of the selected human body parts, a vector cosine distance of selected vectors, an angle change curve of selected angles, a maximum angle difference between selected angles, a maximum speed difference between selected speeds or a maximum difference between stance inclination angles; and
  - the swing result difference comprises at least one of: an average golf speed difference, a maximum golf speed difference, an average distance of golf hitting points, a golf serving angle difference, a golf flight distance difference or a golf rotation direction difference.

11. A method for assisting golf training, comprising:
- capturing a video of a current swing by a user and corresponding simulator data, wherein the simulator data comprises golf hitting data and golf flight data of the current swing, the video is captured by a video acquisition device, and the simulator data is captured by a golf simulator;
- analyzing a swing action in the video by using a plurality of preset human body key points related to the swing action to obtain an image frame sequence corresponding to each swing stage in the current swing and further obtain a human body key point set sequence corresponding to the image frame sequence, wherein each frame image of the image frame sequence is corresponding to a human body key point set of the human body key point set sequence, and a single swing action comprises a plurality of predetermined swing stages;

according to a relationship between the human body key points in the human body key point set sequence corresponding to each swing stage, determining a plurality of action features corresponding to a current swing action;

aligning the plurality of action features of the current swing with a plurality of action features corresponding to an optimal personal swing model preset for the user in time and space;

comparing one or more of the plurality of action features of the current swing with corresponding one or more of the plurality of action features corresponding to the optimal personal swing model to obtain an action difference between the current swing and the optimal personal swing model, wherein the optimal personal swing model is preselected from historical swing actions of the user or is a swing action of the user that is set by the user under guidance of a coach; and comparing at least one of the golf hitting data or the golf flight data of the current swing with at least one of golf hitting data or golf flight data corresponding to the optimal personal swing model, to obtain a swing result difference between the current swing and the optimal personal swing model, wherein the analyzing a swing action in the video by using a plurality of preset human body key points related to the swing action to obtain an image frame sequence corresponding to each swing stage in the current swing and further obtain a human body key point set sequence corresponding to the image frame sequence comprises:

using a trained human body key point detection model to obtain a human body key point set corresponding to each image frame in all image frames comprised in the current swing;

using a pre-trained action alignment network model to align the image frames comprised in the current swing with a preset complete swing action frame number template to obtain an image frame sequence after such alignment during the current swing;

using a trained action classification model to perform action classification on the image frame sequence aligned during the current swing, to obtain an image frame sequence corresponding to the swing stage in the current swing; and according to the human body key point sets corresponding to the image frames, obtaining the human body key point set sequence corresponding to the image frame sequence.

12. The method according to claim 11, wherein after the obtaining the human body key point set sequence corresponding to the image frame sequence, the method further comprises performing smooth filtering on the human body key points in the human body key point sets corresponding to the image frames to obtain human body key points subjected to the smooth filtering; and the obtaining the human body key point set sequence corresponding to the image frame sequence according to the human body key point sets corresponding to the image frames comprises obtaining the human body key point set sequence corresponding to the image frame sequence according to the human body key point sets constituted by the human body key points subjected to the smooth filtering.

* * * * *